Figure 1:
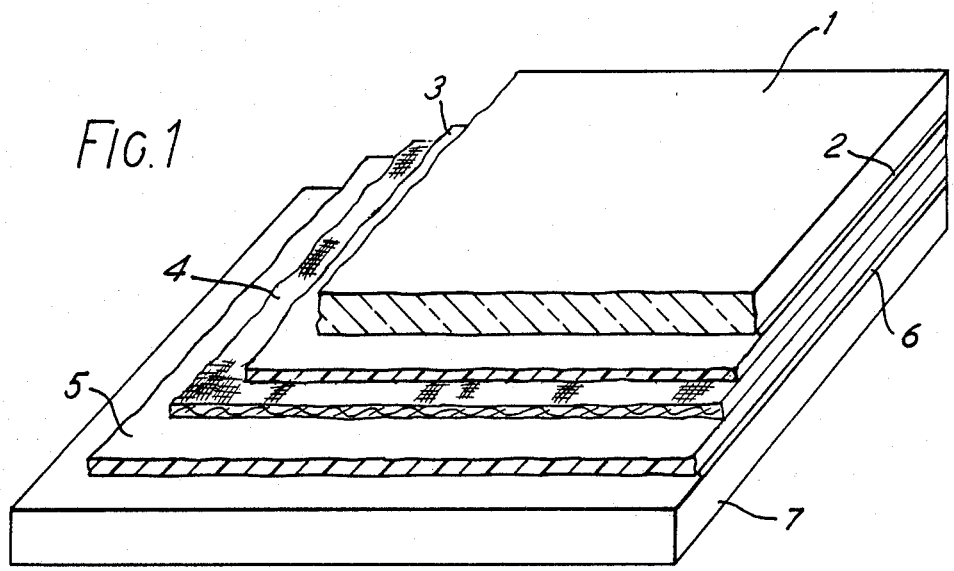

United States Patent [19]

Jarrett

[11] Patent Number: 4,824,722

[45] Date of Patent: Apr. 25, 1989

[54] SAFETY GLASS LAMINATES

[75] Inventor: Kenneth B. Jarrett, Woodbridge, United Kingdom

[73] Assignee: Deltaglass SA, Fribourg, Switzerland

[21] Appl. No.: 26,507

[22] Filed: Mar. 17, 1987

[30] Foreign Application Priority Data

Mar. 17, 1986 [GB] United Kingdom ............... 8606576
Mar. 17, 1986 [GB] United Kingdom ............... 8606578

[51] Int. Cl.$^4$ .................. C03C 27/12; B02B 17/10; C09J 7/02
[52] U.S. Cl. .................... 428/430; 428/436; 428/285; 428/287; 428/458
[58] Field of Search .............. 428/430, 447, 913.2, 428/437, 436, 912.2, 458, 285, 287

[56] References Cited

U.S. PATENT DOCUMENTS

| | | |
|---|---|---|
| 3,558,422 | 1/1971 | Hamilton et al. |
| 4,173,672 | 11/1979 | Mannheim ................ 428/912.2 |
| 4,328,276 | 5/1982 | Swarovski ............... 428/912.2 X |
| 4,438,174 | 3/1984 | Whewell .................. 428/430 X |
| 4,469,737 | 9/1984 | Kain ........................ 428/447 X |
| 4,556,600 | 12/1985 | Kraembing et al. ........ 428/430 X |
| 4,705,721 | 11/1987 | Frisch et al. ............. 428/430 X |

FOREIGN PATENT DOCUMENTS

| | | |
|---|---|---|
| 379130 | 11/1985 | Austria . |
| 743553 | 9/1952 | Fed. Rep. of Germany . |
| 2050656 | 4/1971 | France . |
| 2495130 | 6/1982 | France ................... 428/425.6 |

*Primary Examiner*—Nancy A. B. Swisher
*Attorney, Agent, or Firm*—Browdy & Neimark

[57] ABSTRACT

A safety glass laminate comprising a first sheet of organic or inorganic glass and a second rigid sheet, which may also be of organic or inorganic glass, with a flexible plastics interlayer therebetween bonded to each of the sheets by adhesive which has been cured by irradiation, the interlayer comprising two outer layers of plastics film and an inner layer of fabric, preferably woven polyester, interposed therebetween. The laminate may, for example, be employed as decorative cladding or as a panel for a glass door. A security window may be provided in the laminate.

9 Claims, 1 Drawing Sheet

SAFETY GLASS LAMINATES

This invention relates to laminates and in particular to safety glass laminates. It also relates to the provision of a transparent security window in a safety glass laminate.

It is known to produce impact-resistant laminates including two sheets of inorganic or organic glass with a shock-absorbent interlayer of plastics material interposed between the two sheets and bonded to each of them by means of an adhesive composition. Normally in the case of a safety glass the sheets are provided by a first sheet of inorganic glass and a second sheet of organic or inorganic glass. In a recent development the bonding is effected by means of an adhesive composition which is cured by irradiation, most usually UV irradiation. Particuarly advantageous UV curable adhesive compositions are disclosed in EP-A-No. 0108631 and EPA-No. 108630. By the development of these adhesives, it has proved possible to replace the expensive polyvinylbutyral conventionally employed as the interlayer by cheaper, more readily available and more easily handled materials such as vinyl chloride polymer by which is meant a homopolymer of vinyl chloride or a copolymer containing a major proportion of vinyl chloride.

Such safety glass laminates may be manufactured by applying a layer of a liquid radiation-curable adhesive composition to the top surface of an inorganic glass or plastics sheet, placing a layer of plastics material onto that adhesive layer, applying a second layer of a liquid radiation-curable adhesive composition onto the free face of the plastics material and placing the second sheet onto that second adhesive layer. The bonds are formed by curing the adhesive layers by irradiation.

The resulting safety laminate is required to have two important properties; first it must have a high resistance to shattering on impact and secondly, in the event that it does shatter, the shards should be retained in the laminate rather than become detached therefrom, especially where inorganic glass is employed.

The present invention provides a laminate of the kind in which a first sheet of organic or inorganic glass is bonded to a second rigid sheet with a shock-absorbent plastics interlayer therebetween and which has improved performance under impact compared with the kind described above.

In accordance with the present invention there is provided a laminate comprising a first sheet of organic or inorganic glass and a second rigid sheet with a flexible plastics interlayer therebetween and wherein the interlayer is bonded to each of the sheets by means of a layer of an adhesive composition which has been cured by irradiation and the second sheet is not opaque to the radiation employed for curing the adhesive to bond said second sheet to said interlayer characterised in that the interlayer comprises a laminate comprising two layers of plastics film with a fabric layer interposed therebetween.

The plastics interlayer should be flexible and also should bond well to the glass sheet and second rigid sheet when radiation curable adhesive is employed and generally be of a nature such that it confers shock-absorbent properties on the finished laminate. Usually the plastics interlayer will be no more than 5 or 6 mm thick, preferably no more than 3 or 4 mm thick.

Each of the layers of plastics film employed in the plastics interlayer may be formed from any plastics material which can be bonded to the first sheet or second rigid sheet by a radiation curable adhesive and which provides the desired shock absorbence in the finished laminate. Good results are obtained using vinyl chloride polymer which includes a plasticiser. If no plasticiser is included the vinyl chloride polymer is generally too brittle for present purposes. Usually about 20 or 30 to 50 parts of plasticiser per 100 parts of vinyl chloride polymer will be employed. However, it is considered that the choice of plastics material is not limited just to vinyl chloride polymers.

The fabric layer may be woven or non-woven, patterned or plain. Preferably it comprises woven polyester but other fibres may be employed which may be natural or synthetic fibres or a mixture thereof. Normally the fabric layer will comprise a woven or knitted textile or netting, for example a polyester netting.

The interlayer may be formed, for example, by heat fusing two sheets of plastics film together with the fabric layer interposed between them. A suitable interlayer including a polyester fabric layer is manufactured by Wardle Storeys PLC of Bangor, Wales under the trade name Plastolene. It is available in various thicknesses.

In addition to having improved performance under impact, in that they show improved resistance to impact or improved retention of glass shards on shattering, or both, the laminates of the present invention can present attractive novel decorative effects by appropriate choice of the fabric interlayer which may be woven or non-woven, patterned or plain.

To obtain a good decorative effect from the use of the fabric layer, it is preferred that the first sheet, the plastics film lying between the first sheet and the fabric layer, and the adhesive layer between the first sheet and said plastics film are clear and transparent although they need not be colourless. However, the plastics film on the other side of the fabric layer and the second sheet need not be clear or transparent provided, of course, that the said second sheet is not opaque to the radiation employed to cure the adhesive employed to bond them together. Nevertheless, for many applications, it will be desirable for the fabric layer to be visible from both sides of the laminate, in which case it is preferred that the second sheet is organic or inorganic glass and that the plastics film and adhesive layers lying between said second sheet and said fabric layer are also clear and transparent although it is not essential that the second sheet, adhesive layer or plastics film is colourless. By "organic glass" is meant a polymeric material used as a glass substitute, for example, methacrylate polymer such as that marketed under the trade names Perspex and Lucite or polycarbonate such as Makrolon.

Normally, safety glass laminates will include at least one sheet of inorganic glass because this is often cheaper and more scratch-resistant than organic glass. Such inorganic glass is usually more brittle than organic glass and therefore laminates formed from it particularly benefit from the improved impact resistance afforded by the present invention.

A clear transparent bond may be obtained by employing a radiation-curable adhesive such as one of those described in EP-A-No. 0108631 and EP-A-No. 108630. Such adhesives are especially suitable when the plastics film layers of the interlayer comprise vinyl chloride polymer. When it is desired for the adhesive layer to be coloured, the dye or pigment employed must not be such as to destroy the desired properties of the adhesive or interfere with its cure.

It will be understood that a shock-absorbent mirror may be produced according to the invention if one of the faces of the first sheet or second sheet or of a layer of the plastics film is metallised. Usually, the metallised face would be one that is in the interior of the laminate so that it is not susceptible to scratching by external objects.

Laminates according to the present invention may be employed, for example, as glass tops for tables, glass panel doors for shower cubicles, partition walls and decorative cladding.

It will be understood that, if desired, the laminate may include additional layers. For example, if projectile-resistant, e.g. bullet-proof, properties are desired it may comprise an outer sheet of glass, then a sheet of polycarbonate, then the plastics interlayer, a second sheet of polycarbonate and finally a second outer sheet of glass.

In many applications for safety glass laminates, it is desired to provide an article such as a door or panel part of which is transparent, to form a window, and part of which is not. In general, this is achieved at present by providing separate panels, at least one of which is transparent and at least one of which is not. However, the joints between such panels tend to be zones of weakness in the structure.

This drawback may be overcome by employing a modification of the present invention which provides a laminate comprising two sheets or organic or inorganic transparent glass with a flexible plastics interlayer therebetween which is bonded to each of the sheets by means of a layer of a transparent adhesive composition which has been cured by irradiation characterised in that the flexible plastics interlayer includes at least one first portion which is non-transparent and comprises two outer layers each of plastics film with an inner layer of fabric interposed therebetween and at least one second portion which is transparent and forms a window in the laminate.

In order to form the first and second portions the plastics interlayer may be provided as a piece which comprises two outer layers of transparent plastics film and an inner layer of non-transparent fabric interposed therebetween said inner layer being not co-extensive with said two outer layers of the interlayer whereby said first and second portions are provided. For example, the inner layer may have a hole in it which provides the second, window, portion or it may only extend over part of the laminate. Alternatively, the plastics interlayer itself may comprise at least two components, at least one of which comprises two layers of plastics film with a layer of non-transparent fabric interposed therebetween and at least another of which comprises a transparent plastics panel, said panel forming a window in the laminate. In this case the second, window, portion will generally be provided by a panel of transparent plastics interlayer of a nature such as to enhance the shock-absorbing properties of the laminate. For example, the transparent component may be of plastics film such as vinyl chloride polymer. The transparent component of the interlayer should be of substantially the same thickness as the non-transparent component in order to minimise the possibility of zones of weakness arising at the boundary of the two components and to help to achieve satisfactory bonding between the layers of the laminate.

If it is desired that the window portion should be a one-way mirror, that portion of the laminate will include a metallised layer. The metallised layer will be provided on a relevant part of one face of one of the first and second sheets or a face of the plastics interlayer.

It will be understood that the plastics interlayer for the second, window, portion may comprise a layer of material sandwiched between two layers of plastics film provided that that material is of a nature that permits the window to be substantially transparent, for example a material with an open weave, and does not seriously reduce the impact resistance of the window portion. A material layer may be included in the window portion for reasons of strength, for example, wire mesh may be employed.

Figure 2:
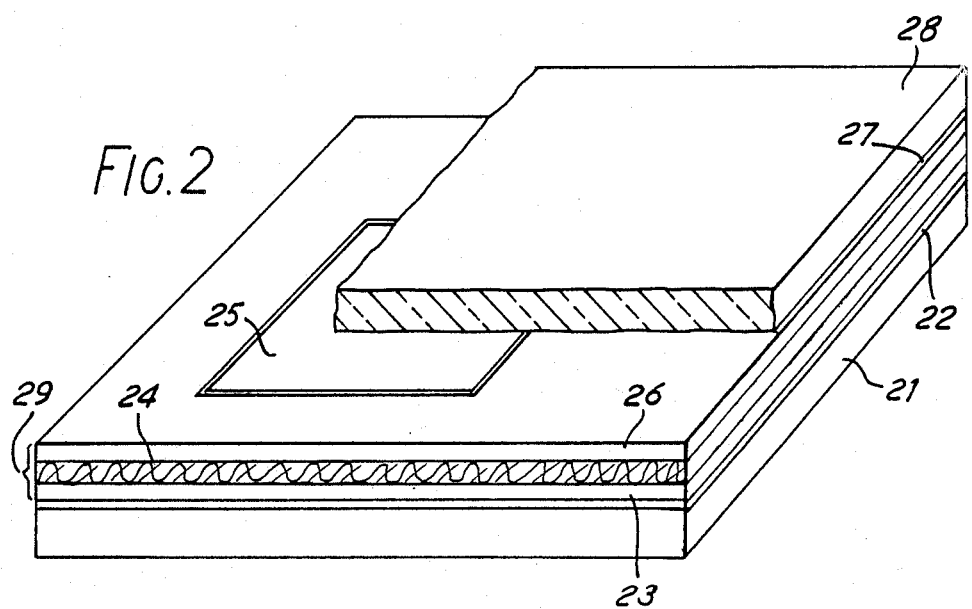

The invention will now be illustrated by the following Example and with reference to the accompanying drawings of which FIG. 1 is a perspective view (part cut away) of a laminate according to the invention, and FIG. 2 is a perspective view (part cut away) of a laminate according to the invention which is provided with a security window.

Referring to FIG. 1, 1 is a glass sheet bonded to an outer layer 3 of interlayer 3, 4, 5, by a layer 2 of a radiation-cured adhesive composition. The other outer layer 5 of the interlayer 3, 4, 5 is bonded by a layer 6 of a radiation-cured adhesive composition to another sheet of glass 7. The plastics interlayer 3, 4, 5 is a layer of Plastolene (marketed by Wardle Storeys PLC) and comprises two outer layers of plasticised vinyl chloride polymer, 3 and 5 which sandwich a layer of woven polyester fabric 4.

EXAMPLE

The impact properties of a laminate of this construction and in which the glass layers were 4 mm thick and the Plastolene was 3 mm thick were tested.

A 2.06 kg steel ball was dropped repeatedly from a height of 3 metres onto a face of laminate 50.6 cm x 50.6 cm square. The number of strikes required for the ball to pass completely through the laminate are shown in Table 1. Several such experiments were carried out.

This procedure was then repeated with a laminate of the same construction except that a 3 mm thick layer of Vybak 241 vinyl chloride polymer film (manufactured by Wardle Storeys PLC) was substituted for the Plastolene layer. The results of this experiment are also shown in Table 1.

On a visual examination, the amount of glass shards detached on impact from the samples when the interlayer was "Plastolene" was substantially less than (about half as much as) that detached when the interlayer was "Vybak".

TABLE 1

| | Number of strikes required for ball to pass completely through laminate | |
|---|---|---|
| Laminate Composition | 4 mm glass 3 mm Plastolene 4 mm glass | 4 mm glass 3 mm Vybak 241 4 mm glass |
| Test No. 1 | 8 | 6 |
| Test No. 2 | 9 | 5 |
| Test No. 3 | 7 | 6 |
| Test No. 4 | 9 | 4 |
| Test No. 5 | 8 | 5 |

Referring to FIG. 2, the laminate comprises in essence three layers 21, 28, and 29 bonded together by adhesive layers 22, 27 which have been cured by U.V. radiation. Suitable radiation-curable adhesives are those described in EP-A-No. 0108631 and EP-A-No. 0108630. The outer layers 21, 28 are inorganic glass. The inner layer 29 is a composite which is formed by cutting a window in a sheet of non-transparent material, the composition of which is described in more detail below, and providing a panel 25 of clear plastics film to fit exactly in the window so formed. The panel 25 is of substantially the same thickness as the non-transparent material so as to avoid localised areas of weakness in the laminate caused by thickness variations in the inner layer 29.

The sheet of non-transparent material consists of two sheets of plasticised vinyl chloride polymer film 23 and 26 and which sandwich a layer of polyester fabric 24.

The panel 25 of clear plastics film is a panel of plasticised vinyl chloride polymer film of the same lateral dimensions as the window. This panel ensures that the window portion of the laminate is shock-absorbent as well as the non-transparent portion. The panel 25 may be formed of more than one layer of plastics film, so that it is of substantially the same thickness as the sheet of opaque material.

I claim:

1. A laminate comprising a first sheet of organic or inorganic glass and a second rigid sheet with a flexible plastics interlayer therebetween and wherein the interlayer is bonded to each of the sheets by means of a layer of an adhesive composition which has been cured by irradiation and the second sheet is not opaque to the radiation employed for curing the adhesive to bond said second sheet to said interlayer, end wherein the interlayer comprises two outer layers each of plastics film with an inner layer of fabric interposed therebetween.

2. A laminate as claimed in claim 1 wherein the outer layers of the interlayer comprise plasticized vinyl chloride polymer.

3. A laminate as claimed in claim 1, wherein said inner layer comprises woven polyester.

4. A laminate as claimed in claim 1, wherein a face selected from the faces of the layers of plastics film, first sheet and second sheet is metallised.

5. A laminate as claimed in claim 1, wherein at least one of the said first and second sheets is an inorganic glass sheet.

6. A laminate, which comprises two sheets of organic or inorganic transparent glass with a flexible plastics interlayer therebetween which is bonded to each of the sheets by means of a transparent adhesive composition which has been cured by irradiation, the flexible plastics interlayer including at least one first portion which is non-transparent and comprises two outer layers each of plastics film with an inner layer of fabric interposed therebetween and at least one second portion which is transparent and forms a window in the laminate.

7. A laminate as claimed in claim 6, wherein the plastics interlayer is provided as a piece which comprises two outer layers of transparent plastics film and an inner layer of non-transparent fabric interposed therebetween said inner layer being not co-extensive with said two outer layers of the interlayer whereby said first and second portions are provided.

8. A laminate as claimed in claim 6, wherein the interlayer comprises at least two components, at least one of which comprises two layers of plastics film with a layer of non-transparent fabric interposed therebetween and at least another of which comprises a transparent plastics panel of substantially the same thickness as said at least one non-transparent component, said panel forming a window in the laminate.

9. A safety glass laminate which is at least in part transparent, comprising
   first and second rigid glass sheets of at least partially transparent glass forming the outer surfaces of said laminate, at least one of said first and second sheets consisting of inorganic glass;
   an interlayer disposed between said two sheets of glass, said interlayer consisting essentially of an inner layer of woven fabric sandwiched between two outer layers each formed of thermoplastic film; and
   first and second layers of irradiation cured adhesive integrally bonding said outer layers of said interlayer to said first and second glass sheets, thereby providing an integral laminate of at least seven layers.

* * * * *